W. O. BORCHERDT.
REVOLVING SCREEN AND METHOD OF SCREENING.
APPLICATION FILED JAN. 7, 1916.
1,212,179.
Patented Jan. 16, 1917.
3 SHEETS—SHEET 3.
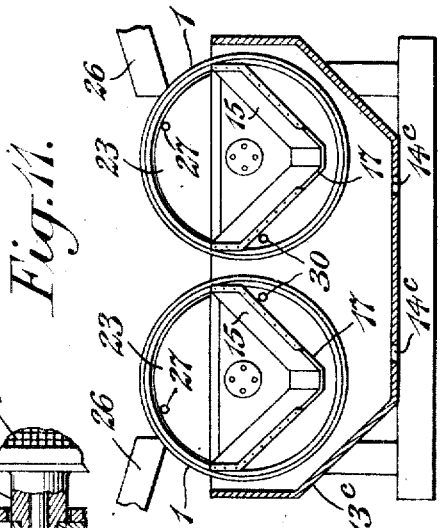
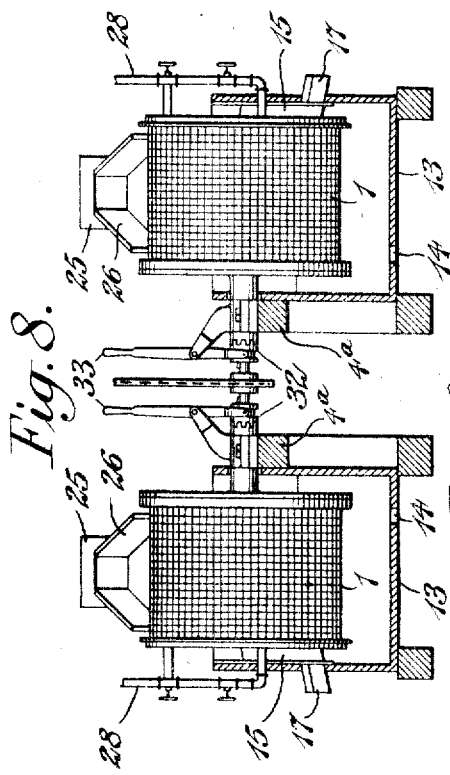
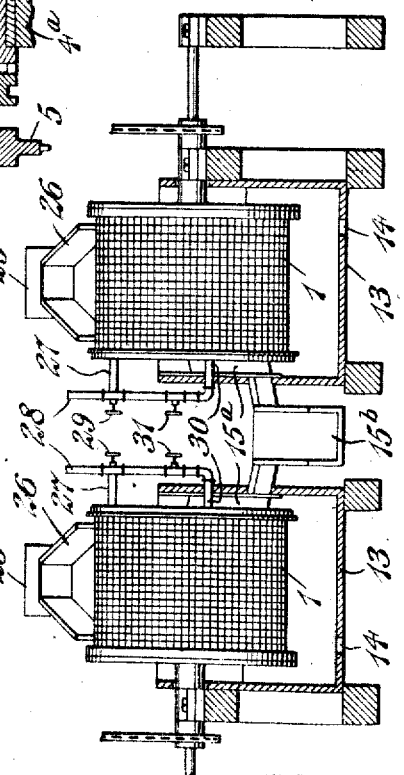
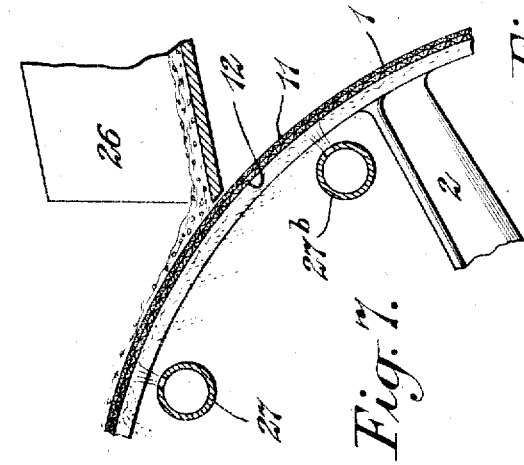
INVENTOR
Walter O. Borcherdt
BY
Pennie Davis Marvin
ATTORNEYS

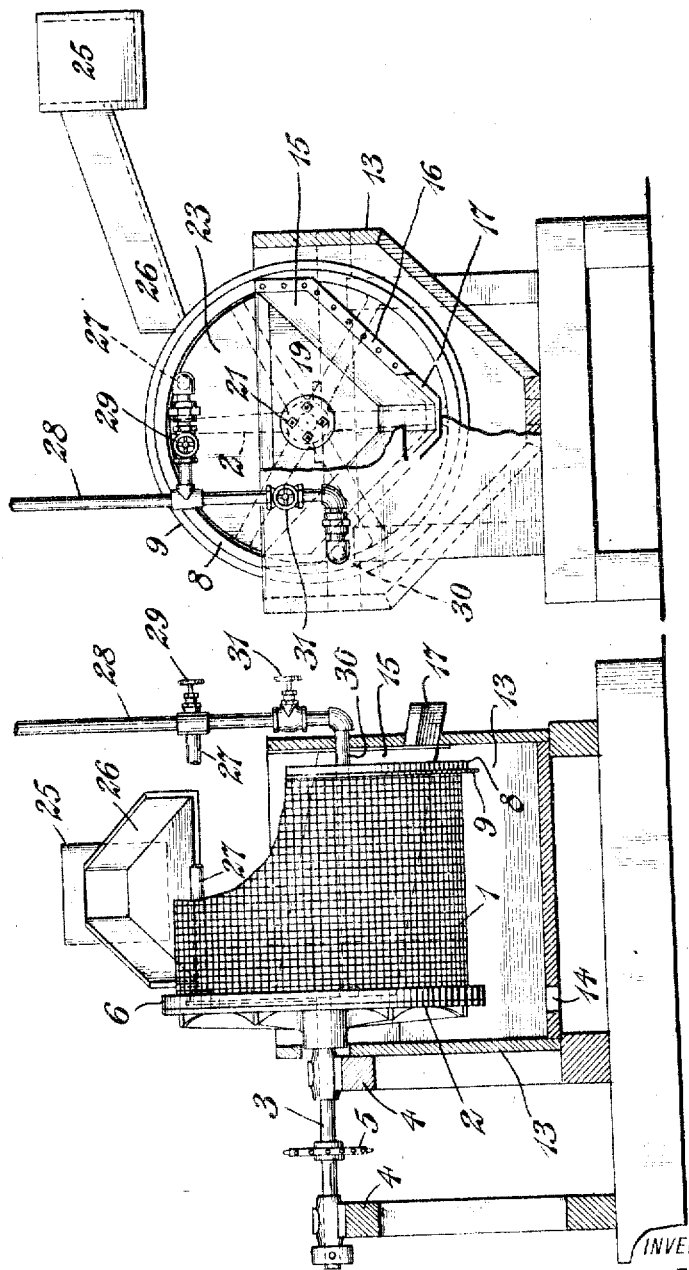

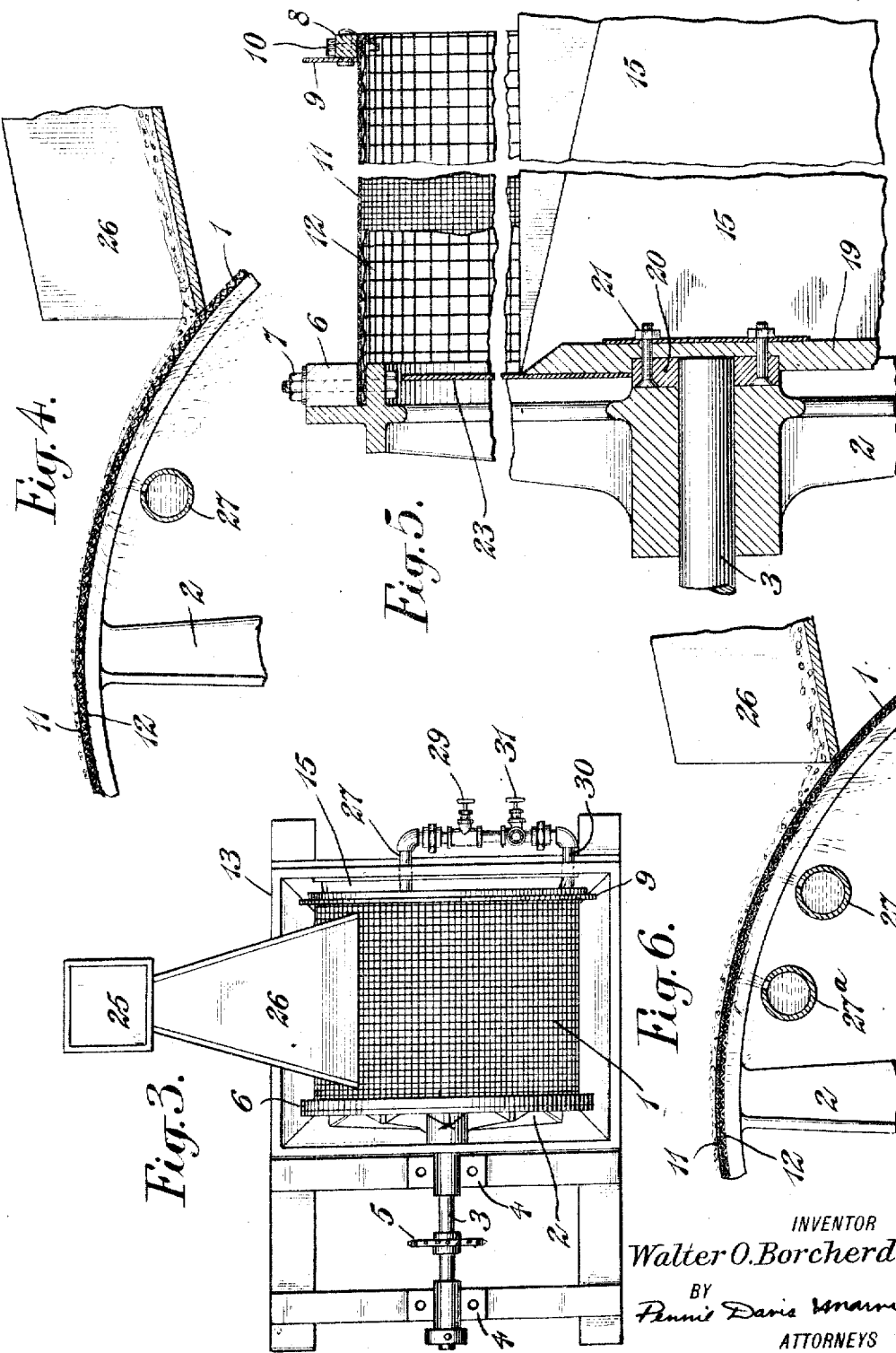

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

REVOLVING SCREEN AND METHOD OF SCREENING.

1,212,179.  Specification of Letters Patent.  Patented Jan. 16, 1917.

Application filed January 7, 1916. Serial No. 70,807.

*To all whom it may concern:*

Be it known that I, WALTER O. BORCHERDT, a citizen of the United States, and a resident of Austinville, in the county of Wythe and State of Virginia, have invented certain new and useful Improvements in Revolving Screens and Methods of Screening; and I do hereby declare the following to be a full, clear, and exact description of the invention, such as will enable others skilled in the art to which it appertains to make and use the same.

This invention relates to the screening and dehydrating of ore pulp and similar material; and it comprises a revolving screen of an improved construction and operation, and a novel method of screening of the ore pulp and similar material therewith.

The revolving screen of the present invention comprises, essentially, a screen cylinder or drum of suitable screening material, and suitably supported and rotated, together with means for feeding to the upper portion of the drum the material to be screened, and one or more spray devices within the drum arranged to discharge upwardly against the screen at a point beyond that at which the material is fed to the drum, so that the mesh of the screen is cleaned and water is re-introduced into the material with a further resulting screening effect.

In describing the novel revolving screen of the present invention, and the process of screening which is practised therewith, it will be assumed that the material to be screened is ore pulp or similar material of a liquid and mobile nature, so that it can be fed to the screen in the form of a substantially uniform or homogeneous fluid or pulp, although a deficiency in the amount of water present in the pulp will be in part remedied during the screening process. Since ore pulps commonly contain considerable amounts of water, it will be assumed, in describing the present invention, that water is the liquid or fluid which is present in the admixture with the material to be screened. It will be understood, however, that other liquids will operate in substantially the same manner, and accordingly I consider such liquids as the equivalents of water for purposes of the present invention.

I will now proceed to describe my invention more in detail with particular reference to the embodiments thereof illustrated in the accompanying drawings, but it is intended and understood that the invention will be illustrated by, but is not limited to, the specific embodiments thus illustrated and described.

In the accompanying drawings, Figure 1 shows, partly in central longitudinal section and partly in elevation with parts broken away, a revolving screen embodying the invention; Fig. 2 shows the screen in end elevation, with parts broken away; Fig. 3 is a plan view of the screen; Fig. 4 is an enlarged detail sectional view of the screen drum, water spray, and feed trough; Fig. 5 is an enlarged central longitudinal section of parts of the screen drum and inside hopper; Fig. 6 shows a modification of the construction of Fig. 4; Fig. 7 shows a further modification; Fig. 8 shows two screens arranged for independent or simultaneous operation; Fig. 9 is a central section of one of the bearings of Fig. 8; Fig. 10 shows a further arrangement of two screens; and Fig. 11 shows a still further arrangement of screens.

The revolving screen illustrated is made up of the circular cylinder or drum 1 suitably secured to and supported by the spider or head 2 at one end. The spider is carried by a shaft 3 which turns in bearings 4, and which is driven by any suitable means, such as a sprocket wheel 5, so that the entire drum can be rotated at the desired speed. The screen drum is clamped to the head or spider by segmental wooden blocks 6 and bolts 7. The other end of the screen drum is stiffened and held in its circular shape by the rings 8 and 9 suitably secured together, as by rivets, and with the screen bolted to the rings by bolts 10.

The size of the screen drum or cylinder can be varied within rather wide limits in accordance with the quantity of the material to be screened, the size of the particles of the material, and other conditions. When coarse sizes of materials are to be screened, a reasonably heavy wire screen can be used, and a single thickness of screen may suffice. When, however, fine sizes of material are to be removed, it is advantageous to construct the drum of an outer screen cloth, supported by, and secured to, an inner framework of heavy screen cloth, perforated plate, or lattice bars, also in the form of a cylinder. In this case, the actual screening surface is supported at every point by a framework of coarse mesh heavy wire screen cloth, or other supporting material, which provides the requisite mechanical strength and at the same time does not in any way interfere with the passage of the fine ore particles. When coarser sizes of undersize product are desired, and a reasonably heavy wire can be used, it becomes possible to dispense with the supporting screen as above indicated, and the screening surface then becomes self-supporting. Whether the drum is to be made of a single thickness of the screening, or a plurality of thicknesses, will depend upon the diameter and width of the drum, the size of wire used in making the screen, the material to be screened, and other considerations. Since the resistance of the drum to deformation from the circular depends upon the friction at the crossing points of the wires in the screen, it is advisable in most cases to use either brass screen cloth with the joints soldered, or steel wire screen which has been galvanized or welded after weaving, since either treatment effectively prevents relative movement of the wires. Such fabrics are of value particularly for the inner supporting screen which serves as the support for the outer screen fabric.

The screen drum illustrated in the drawings is made up of an outer screen fabric 11 of fine mesh, and an inner supporting screen of coarser fabric 12, both screens being suitably attached to the supporting spider at one end and to the stiffening ring at the other. Surrounding the lower half of the screen drum, and extending up high enough to catch any splash, is the outside hopper 13, constructed and arranged to catch all material that falls from the screen, and having an outlet 14 suitably arranged to discharge the material to a conveyer or to any other suitable receptacle.

Extending into the open and overhung end of the drum is the inside hopper 15. This inside hopper is bolted to and supported by the outer hopper 13 at one end, as indicated at 16, Fig. 2, and it is provided with an outlet trough portion 17 extending outwardly through a hole in the end of the outer hopper. The inner end 19 of the hopper 15 is supported by the end of the shaft 3. By reference to Fig. 5 it will be seen that the end 19 of the hopper has a ring or casting 20 secured thereto by bolts 21, and that this casting or ring is bored to pass over and run upon the inward projection of the shaft 3 which carries the screen spider, the ring 20 being faced to bear against the face of the screen spider hub. By this means the inside hopper is held centrally positioned within the screen drum, and is supported to resist the weight of the material which it receives. The inside hopper, as well as the outside hopper, are so shaped as to best fulfil their functions of catching all material which passes through the screen cloth, as well as that which falls off the screen cloth. The inside hopper is also constructed so that it will convey the material which passes through the screen to its discharge opening at the overhung end of the drum.

Secured above the screen drum is a feed spout or "sole", which is adjustable with respect to the drum, and with respect to its angle with the horizontal (by means not shown), so that it can be tilted at different angles, and arranged at a higher or lower position with respect to the drum, depending upon the character of the material to be fed, and the best position for the delivery of the material to the screening surface, so that for any given character of material, the best position for the feed of the material to the screening surface can be obtained. The function of the feed spout or "sole" is to deliver the material to be screened, intimately mixed with the water used as a vehicle, against the screening surface in the form of a sheet of uniform thickness and composition, and at uniform velocity over the whole width of the screening surface. In the apparatus illustrated, the material to be screened is fed from the supply tank or trough 25 to the feed spout or "sole" 26 and thence to the screen drum.

Supported within the screen drum, and below the upper portion of the screening surface, are one or more spray pipes, the jets from which are directed upwardly against the screen cloth beyond the point at which the feed strikes the screen. The function of these jets is to clear the holes in the screen fabric which have been stopped up or "blanked" by particles too large to pass through with the water originally contained in the feed, and to produce an entirely new arrangement of the particles which have deposited on the cloth by the draining away of the original feed water by introducing a fresh amount of the water required as a vehicle, and thus securing, on the now freshly cleaned surface, a secondary screening action. This screening action is very rapid, the water being entirely removed within a short distance and carrying with it the fine material. It is therefore possible to place spray pipes as close together as the distance which the screen travels while the water is being removed, and thus secure an increase in the screening efficiency for each pipe so added, within the limits set by the increasing angularity of the screening surface with the horizontal plane which makes it unprofitable to set the pipes lower than a certain point, as will be readily appreciated.

In Fig. 4 a single spray pipe 27 is shown extending lengthwise within the cylinder beyond the point at which the material is fed to the screen drum. The water is fed to this spray pipe through the supply pipe 28 and the supply is regulated by a suitable valve 29. It will be seen that the spray pipe 27 discharges upwardly against the under side of the screen fabric and thus cleans the screen and re-introduces water into the material thereon, in the manner above indicated.

In Fig. 6 two spray pipes 27 and 27ª are shown arranged one beyond the other to introduce successively further amounts of water into the material being screened. It will be seen that the material is fed to the screen upon the upwardly moving side thereof, and that this material tends to be carried up over the central portion of the screen, and to be discharged on the other side. The arrangement is such that the material tends to form a pool at the point where it is discharged against the drum, while the water sprays are arranged beyond the point of feed, and at a somewhat higher position, to re-introduce water into the material after the original water has been drained off. A further washing of the material is thus effected, as well as a further screening action. In addition to the spray pipes arranged within the screen drum near the upper portion thereof, and referred to as the upper or screening sprays, one or more other spray pipes or sprays can be used. These are supported within the screen drum, wherever desired below the horizontal center line of the apparatus, with their jets directed radially outward. Their function is to remove from the holes of the screen any particles which have a tendency to stick in these holes or blind them, so that the screening surface when re-presented to the feed, shall be clean and ready for action. These sprays are also arranged below the upper edge of the inside hopper, and they thus re-introduce water into the de-watered over-size material from the screen facilitating its removal from the outside or over-size hopper. Such an auxiliary spray pipe is indicated at 30, also leading from the supply pipe 28, and having a suitable regulating valve 31. The speed at which the screen drum is revolved is determined by the quantity of the material to be handled and the efficiency desired. If small quantities are to be handled there is no object in running the screen at a greater speed than that necessary to spread the feed into a layer of such thickness that when it strikes the screening surface each particle, theoretically, will have an independent opportunity to present itself to a hole. The attainment of high efficiency very largely depends upon the perfection with which this condition is met. The limiting condition as regards increase of speed is only met with when the circumferential velocity of the screening surface exceeds the tangential component of the velocity of the feed at impact. When this condition is realized, there is a reduction in the average size of the particles passed through a given size screen aperture, since the feed particles in meeting the screen are struck by the wires and accelerated to a tangential velocity exceeding that imparted to them on the feed spout or "sole"; while under the normal condition of operation, where the tangential velocity of the feed equals, or is greater than, the circumferential velocity of the screening surface, the feed particles in striking the screening surface are retarded in velocity, allowing them ample opportunity to pass through the screen apertures. In general, it may be stated that the usual velocity of the screening surface will lie between 100 and 300 feet per minute. For convenience in securing sufficient slope for the under-size hopper, to permit it to convey the material caught by it to its discharge, it is usually best to make the width of the drum equal to, or less than, the diameter, but with a sufficiently stiff supporting screen, it is feasible to use various other proportions. Where a plurality of revolving screens are necessary or desirable, these may be entirely independent in their construction and operation, or they may be combined in various ways.

Certain combinations which may, with advantage, be made, are indicated in Figs. 8 to 11. In the arrangement of Fig. 8, the two screen drums are mounted upon the same shaft at opposite ends. With this arrangement, both the inside and the outside hoppers are shown as separate and independent, but one set of bearings 4ª serves for both drums. By the provision of suitable clutches 32, and operating levers 33, either screen may be rotated independently of the other, or both screens may be rotated together, at the same speed, thus making provision for repairing one screen while the other carries the whole load, and for driving both screens together, when desired. The two screens may handle the same material, or material of different size. They may also be of the same mesh screen or of different mesh. The bearing 4ª and the drum head or spider 2ª of Fig. 8 is shown in detail of Fig. 9. In Fig. 10 two drums are shown mounted on separate shafts, in the same axial line, and with the open overhung ends of the drums facing each other. In this case, independent sets of bearings are necessary, but the inside hoppers 15ª can be united to the same discharge, as indicated at 15ᵇ. In this case also the two drums can be operated independently, and on the same or different material. A further arrangement of two drums is shown in Fig. 11 where they are mounted in a common outside hopper so that the over-size of both screens is united and discharged together. In this case, the shafts of the screens are parallel, and the drums can be rotated independently when desired. The drums are spaced apart sufficiently to avoid interference and to permit discharge of the oversize material. These drums are rotated toward each other so that the over-size of both drums is discharged between them. The provision of independent under-size hoppers enables the under-size from the two drums to be separately collected so that the screens may be operated independently of each other, or operated together, and the under-size from the two screens separately collected. Where a series of graded products is desired, the screens may readily be arranged to treat the material successively, and with the mesh of the successive screens increasing or decreasing in size, depending upon whether the feed to the following screen consists of the over-size or the under-size of the preceding screen. It is of course usually desirable to take out the coarser material first, since the finer screens are thereby subjected to decreasing quantities of feed, although this is by no means necessary for efficient screening or long life of the screen surface. The quantity of water supplied with the feed should be sufficient to render it perfectly liquid and mobile, although any deficiency in this direction can be remedied by means of the screening spray. That is to say, where the feed is not of the proper consistency, the reintroduction of the water by the spray, and the secondary and further screening effect thus produced, results in the securing of the desired screening action. On the other hand, where the pulps or other materials are very dilute, as is the common condition in mills, the screen of the present invention has a wide range of application. The very dilute pulps can be readily handled by properly adjusting the angle of the feed spout, and the position of the feed spout, with respect to the screen drum. In connection with the screening of such dilute pulps it may be noted that the screen of the present invention becomes a very effective de-watering machine when a screen cloth of suitably fine mesh is used. Thus, when a cloth of finer mesh than the particles in the feed is used it is possible to use the screen to de-water the feed. Again, and particularly with tailings, it is possible to use the screen to de-water the tailings, and at the same time to remove therefrom the fine particles of mineral which they usually contain, saving these in the enriched under-sized product for re-treatment on a table. The correct size of wire cloth will of course be determined by the material to be treated, and the results desired. The re-introduction of further amounts of water into the material on the screen results in a further washing and screening of this material, in the manner above pointed out. In mills using a badly screened or classified feed on jigs, a very important increase in total recovery can be made in this way at very small expense, and at the same time the tailings can be de-watered for disposal by conveyer and the waste water recovered for re-use. Where de-watering is desired, together with removal of the finer particles, the lower sprays should not be used, since these would introduced water into the de-watered over-size. At the same time, it may be important to provide for cleaning the screen fabric and for removing therefrom the adhering particles. The arrangement of Fig. 7 enables this cleaning and removal without again introducing water into the over-size. To this end, a pipe 27ᵇ is arranged to discharge its jets against the inner side of the upper part of the drum in advance of the feed so that the meshes of the screen will be cleaned, and the over-size particles will fall off by gravity, while the water will be caught by the inside hopper.

It will be seen that the novel revolving screen of the present invention provides for the screening and de-watering of pulps and similar materials by subjecting these materials to a primary screening action, and by subsequently spraying water against the screen from the side opposite that which receives the material to be screened, so that the water is re-introduced into the material and the particles thereof are rearranged and a further or secondary screening of the material is effected. It will also be seen that the novel method of screening the ore pulp and similar material, of the present invention, comprises a primary screening by feeding the material, intimately mixed with water, upon the screen, and a subsequent or secondary screening by the re-introduction of water into the material and the accompanying cleaning of the screen and rearrangement of the particles of the material.

I claim:—

1. The method of screening ore pulp and similar material, which comprises feeding the material mixed with water upon the upwardly moving portion of a revolving screen and thereby effecting a primary screening of the material and spraying water from below through said screen at a point on the upwardly moving portion of said screen above the point of feed of the material thereto to reintroduce water into the material and rearrange the particles thereof to effect a further or secondary screening of the material; substantially as described.

2. The method of screening ore pulp and similar material, which comprises feeding the material mixed with water upon the upwardly moving portion of a revolving screen and thereby effecting a primary screening of the material, spraying water from below through said screen at a point on the upwardly moving portion of said screen above the point of feed of the material thereto to reintroduce water into the material and rearrange the particles thereof to effect a further or second screening of the material, collecting the material which has passed through the screen in a receptacle within said screen, spraying water through said screen at a point below said receptacle to remove material remaining on said screen, and collecting the material that has failed to pass through said screen in a receptacle below said screen; substantially as described.

3. The method of screening ore pulp and similar material, which comprises feeding the material mixed with water upon the upwardly moving portions of a revolving screen, spraying water from below through said screen at a point on the upwardly moving portion of said screen above the point of feed of the material thereto to reintroduce water into the material and rearrange the particles thereof to effect a further or secondary screening of the material, collecting the material which has passed through the screen in a receptacle within said screen and spraying water through the screen at a point in advance of the point of feed of material thereto and above said receptacle to clean said screen while permitting the water to flow into said receptacle; substantially as described.

4. The method of screening ore pulp and similar material, which comprises feeding the material mixed with water upon the upwardly moving portion of a revolving screen and thereby effecting a primary screening of the material, spraying water from below through said screen at a point on the upwardly moving portion of said screen above the point of feed of the material thereto to reintroduce water into the material and rearrange the particles thereof to effect a further or secondary screening of the material, collecting the material which has passed through the screen in a receptacle within said screen, spraying water through said screen at a point below said receptacle to remove material remaining on said screen, collecting the material that has failed to pass through said screen in a receptacle below said screen, and spraying water through the screen at a point in advance of the point of feed of material thereto and above said receptacle within the screen to clean said screen while permitting the water to flow into said receptacle; substantially as described.

5. A revolving screen for ore pulp and similar material, comprising a screen drum, means for rotating said drum, means for feeding the material to be screened on the upwardly moving portion of the drum and one or more spraying devices within the drum discharging through the upwardly moving portion of said drum above the point of feed of the material thereto, whereby a further or secondary screening of material is effected; substantially as described.

6. A revolving screen for ore pulp and similar material, comprising a screen drum, means for rotating said drum, means for feeding the material to be screened on the upwardly moving portion of the drum and one or more spraying devices within the drum discharging through the upwardly moving portion of said drum above the point of feed of the material thereto, whereby a further or secondary screening of material is effected, means within the drum for collecting the material which has passed through the screen, and one or more spraying devices within the drum discharging through the same below said collecting means, whereby the material that has failed to pass through said screen is removed therefrom; substantially as described.

7. A revolving screen for ore pulp and similar material, comprising a screen drum, means for rotating said drum, means for feeding the material to be screened on the upwardly moving portion of the drum, one or more spraying devices within the drum discharging through the upwardly moving portion of said drum above the point of feed of the material thereto, whereby a further or secondary screening of material is effected, means within the drum for collecting the material which has passed through the screen, one or more spraying devices within the drum discharging through the same below said collecting means, whereby the material that has failed to pass through said screen is removed therefrom, and one or more spraying devices within the drum discharging through the same at a point in advance of the point of feed of material thereto and above said collecting means for cleaning said screen while permitting water to flow into said collecting means; substantially as described.

8. A revolving screen for ore pulp and similar material, comprising a screen drum, means for rotating said drum, means for feeding the material to be screened on the upwardly moving portion of the drum, one or more spraying devices within the drum discharging through the upwardly moving portion of said drum above the point of feed of the material thereto, whereby a further or secondary screening of material is effected, means within the drum for collecting the material which has passed through the screen, and one or more spraying devices within the drum discharging through the same in advance of the point of feed of material thereto and above said collecting means for cleaning said screen while permitting the water to flow into said collecting means; substantially as described.

9. A revolving screen for ore pulp and similar material, comprising a screen drum, means for rotating said drum, means for feeding the material to be screened on the upwardly moving portion of the drum and one or more spraying devices within the drum discharging through the upwardly moving portion of said drum above the point of feed of the material thereto, whereby a further or secondary screening of material is effected, means within the drum for collecting the material which has passed through the screen, and one or more spraying devices within the drum discharging through the same below said collecting means, whereby the material that has failed to pass through said screen is removed therefrom, and means below said drum for collecting the material that has failed to pass through said screen; substantially as described.

10. A revolving screen for ore pulp and similar material, comprising an overhung screen drum having a supporting head or spider at one end, a shaft carrying said head or spider, means for rotating the shaft and drum, means for feeding to the upwardly moving portion of the drum the material to be screened, an outside hopper inclosing the lower portion of the drum and arranged to catch the oversize therefrom, an inside hopper within the drum arranged to catch the material passing through the screen, said inside hopper being secured to and supported by the side wall of the outside hopper at its outer end and having a discharge portion extending through said side wall, and said inside hopper being supported at its inner end upon the end of the shaft; substantially as described.

11. A revolving screen for ore pulp and similar material, comprising a screen drum, means for rotating said drum, means for feeding to the upwardly moving portion of the drum the material to be screened, and one or more spraying devices within the drum arranged to discharge through the upwardly moving portion of the screen above the point of feed of the material thereto, whereby a further or secondary screening of the material is effected, hoppers inside and outside the drum arranged to catch the material passing through the screen and the oversize therefrom respectively, and a spraying device within the drum arranged to discharge against the screen in advance of the point of feed of the material thereto and at a point above the inside hopper, whereby the screen is cleaned by said spraying device and the water is caught by the inside hopper; substantially as described.

12. A revolving screen for ore pulp and similar material, comprising an overhung screen drum having a supporting head or spider at one end and being open at the other, means for rotating said drum, means for feeding upon the upwardly moving portion of said drum the material to be screened and one or more spraying devices extending into the open end of said drum, arranged to discharge through the upwardly moving portion of said screen above the point of feed of the material thereto, whereby a further or secondary screening of the material is effected; substantially as described.

13. An apparatus for screening ore pulp and similar material comprising a shaft, driving means for said shaft, a sleeve surrounding each end of said shaft, clutch mechanism associated with each of said sleeves for connecting them to said shaft at will, a bearing for each sleeve, a spider connected to each sleeve, a screen drum connected to and supported by each spider, means for feeding upon the upwardly moving portions of said drums the material to be screened and one or more spraying devices extending into the open end of each drum, arranged to discharge through the upwardly moving portions of said screens above the points of feed of material thereto, whereby a further or secondary screening of the material is effected.

14. An apparatus for screening ore pulp and similar material, comprising a shaft, a spider mounted upon an end of said shaft, a screen drum composed of an inner supporting screen of relatively coarse mesh and an outer screen of relatively fine mesh, means for attaching said drum to said spider and means attached to the outer edge of said drum for stiffening the same and holding it in circular shape.

In testimony whereof I affix my signature.

WALTER O. BORCHERDT.